United States Patent [19]

Brooks

[11] Patent Number: 4,656,693
[45] Date of Patent: Apr. 14, 1987

[54] GAME SKINNER

[76] Inventor: Paul A. Brooks, 120 Meadow La., Hazlehurst, Miss. 39083

[21] Appl. No.: 848,571

[22] Filed: Apr. 7, 1986

[51] Int. Cl.⁴ .............................. A22B 1/00; A22B 5/16
[52] U.S. Cl. ............................................ 17/44.2; 17/21
[58] Field of Search .................................. 17/21, 44.2

[56] References Cited

U.S. PATENT DOCUMENTS 3,137,030  6/1964  Varner ................................. 17/44.2
3,570,049  3/1971  Muckelrath ......................... 17/44.2
4,094,041  6/1978  Steed .................................. 17/44.2

Primary Examiner—Willie G. Abercrombie
Attorney, Agent, or Firm—Pravel, Gambrell, Hewitt & Kimball

[57] ABSTRACT

An apparatus for field dressing small game animals comprises a base and means for immobilizing the base by attachment to a supporting structure such as a tree. An elongated rod member having two end portions is affixed rigidly to the base at spaced apart positions, the points of attachment defining substantially a perpendicular angle with the base plate, the rod having a central portion which is spaced from the base plate. The central portion includes a generally U-shaped section defined by a 180° bend of the rod. A pair of spikes spaced on opposite sides of the loop and extending generally forwardly of the base supports the hind legs of a small game animal carcass.

6 Claims, 4 Drawing Figures

GAME SKINNER

BACKGROUND OF THE INVENTION

The present invention relates to devices and implements for field dressing small game animals such as rabbits, squirrels, and the like, and more particularly relates to a small implement for supporting a small game animal carcass, and more particularly, either the hind legs or head portion thereof during field dressing or skinning.

There are numerous small game animals which are the subject of hunting laws and usually are regulated by the Fish and Wildlife Service or the state Wildlife and Fisheries Agencies of the various states. These small game animals include, for example, rabbits, squirrels, and the like. Normally these animals are hunted during a very short period of the winter months prior to the breeding season. The various governmental and state agencies allow these animals to be hunted on private and on public land, but set daily bag limits and daily possession limits regulating the harvesting of such game.

For the hunter that pursues rabbits, squirrels and the like, if successful, each of the animals must be quickly and satisfactorily cleaned prior to preparation for cooking. For example, most hunters will "field dress" a small game animal and usually skin the animal before it is packaged in an ice chest or other refrigeration system to prevent spoilage. Field dressing and/or skinning of such an animal can be quite awkward if the carcass is not firmly supported during this operation. Thus, it usually requires two hunters, namely one to support the carcass while the other field dresses or skins the animal. It is to this problem that the present invention is directed.

Various devices have been patented which are directed to the problem of supporting game during a field dressing or a skinning operation. For example, U.S. Pat. No. 4,425,678 issued to Tony Pepper shows a compact, portable game skinning aid designed to facilitate efficient skinning of game animals and fur-bearing animals which includes a cable bar having a pair of internal cable guides communicating with each end of the cable bar and a cable partially embedded in the cable bar with the cable end slidably threaded back through the cable guides to define a loop at each end of the cable bar. The ends of the cable are then attached to a mount bar positioned in spaced relationship with respect to the cable bar. In one embodiment of the invention, an eyebolt is secured to the mount in order to suspend the game skinning aid from a secure mounting point and the feet of the fur-bearing animal are positioned in the cable loops projecting from each end of the cable bar to secure the animal during the skinning operation. In another embodiment, the ends of the cable are embedded in the cable bar and the game skinning aid is fitted with a lock bar which is slidably attached to the cable at a point where the cable exits the top of the cable bar to maintain tension in the cable loops. A cable slide which is slidably carried in the cable support above the lock bar serves to create a support loop for the cable to suspend the game skinning aid from a support object in the embodiment of the invention. However, the Pepper device would not be a rigid structure, but would rather spin about the supporting cables 4 and the supporting loop 17 rendering it unfit for very small animals such as rabbits, squirrels and the like.

Other devices have been provided for in the prior art for suspending animals and bird carcasses to facilitate carrying, dressing or skinning of the bird or animal. Among these devices in the "Game Carrier" disclosed in U.S. Pat. No. 2,904,236, to J. A. Peterson, which consists of a segment of rope having slip-knots fashioned in each end for slipping around the necks of game birds such as ducks and geese, and transporting several of the birds at once.

A "Self-Clamping Suspension" device is disclosed in U.S. Pat. No. 3,194,599 for suspending an animal carcass in an elevated position, which device includes a cage having a transverse strut and self-clamping shoes pivotally carried by the cage, the clamping shoes forming bearing jaws for clamping an animal's feet in the device when the animal is suspended from the device.

Another suspension apparatus is disclosed in U.S. Pat. No. 1,311,779, to I. F. Shank. The Shank "Adjustable Hanger" is designed to suspend hogs for processing, and includes a pair of telescoping bars having a curved end and a pair of cables provided with loops extending through each curved end to engage the feet of a hog, the opposite end of the cables attached to a ring for suspending the hanger from a secure point.

The Morris U.S. Pat. No. 4,027,357 provides a dressing hook for animals having a yoke adapted to be supported from above and having a pair of oppositely, outwardly extending arms adapted to be hingedly moved on the yoke from the outwardly extending position to a collapsed position, the arms are supported in the outstanding extended position by respective arm supports secured to the yoke, and on which the arms are connected to a slide when moved from the extended position to the collapsed position; the arms having hooks at their outer ends adapted to engage the legs of an animal for hanging, and being adapted to be moved into a close, substantially contacting relationship in the collapsible position. This device also suffers in that it is allowed to spin about a supporting line 12 as shown in FIG. 1 of the U.S. Pat. No. 4,027,357 patent. This is unlike the present invention where a rigid supporting base can be attached to an underlying structure such as a tree, the side of the building, or the like for supporting the entire apparatus against such rotation.

Similarly, the Varner U.S. Pat. No. 3,137,030 suffers because it allows the apparatus to spin about a supporting line 24. Further, Varner is a complicated device requiring moving parts which would necessarily cause problems during the field dressing or skinning operation due to the movement of the parts. Often, high stresses are involved which could cause an animal to become disengaged from the Varner type device.

The Muckelrath U.S. Pat. No. 3,570,049 includes a small game skinning board which is a rather complicated device using multiple recesses occupied by the animal carcass during various stages of the field dressing operation. This device is unlike the present invention which uses a supporting base structure and a loop which is faced therefrom carrying spikes and a U-shaped recess for supporting either the feet or head of the animal.

The Steed U.S. Pat. No. 4,094,041 shows a holder for small game that uses both spikes and a loop so that either the head or feet of the animal could be supported. However, the Steed reference suffers because it supports the apparatus with a single contact point which would allow rotation of the entire apparatus about that point of contact. Further, the device would be difficult to use on some supporting structure such as a tree or the side of a building where the animal would most likely come in contact with the supporting structure rendering it dirty or contaminated and thus unfit for use thereafter. This is because the Steed reference does not position the loop and hooks away from the supporting base as is the case with the present invention.

Another relatively complex game skinning board is seen in the Heightshoe U.S. Pat. No. 3,945,083. That reference includes a game dressing board providing a flat panel of suitable material having brackets on opposite sides near the upper end thereof designed to accommodate a transverse rod in spaced relation to the surface thereof. Beneath this rod is a transversely extending plate having a series of notches in spaced relation along the edge of the plate directed toward the lower end of the panel. The panel is transversely grooved beneath the notched edge of the plate. A series of hook-shaped elements are supported by the rod and provided with projecting lugs adopted to engage selectively in any of said notches, in one position thereof, with the hooks extending upwardly and away from the board. The legs of the bird or animal being dressed are impaled on these hooks which are in spaced relation. The body of the bird or animal rests against the panel, permitting the bird and/or animal to be plucked or skinned. A locking slide bar also extending transversley of the panel may be engaged against the hook-shaped elements to hold the hooks in projecting position. While the panel is normally secured on a vertical wall or the like, it may also be secured on a horizontal or inclined plane.

The Pietrowicz U.S. Pat. No. 3,188,130 provides a small game hanging device which is similar to the aforementioned Pepper reference. Pietrowicz uses a supporting rope 11 which causes problems in that the entire support apparatus can spin, rendering it unfit because of instability.

The "Poultry Shackle" of Zebarth, U.S. Pat. No. 2,981,972 is similar to the aforementioned Steed reference. Steed and Zebarth both suffer because of the fact that the recesses provided for carrying the animal are positioned in a relatively close contact with the plane of any supporting structure, thus causing the animal to come in contact with the supporting structure which might be a tree, or the side of a barn or such building. In such cases, the animal becomes contaminated with dirt or tree bark. This is unlike the present invention wherein the supporting structure is positioned a distance away from the supporting structure as will be described more fully hereinafter.

SUMMARY OF THE INVENTION

The present invention solves these prior art problems and shortcomings by providing a one piece, simple yet structurally sound apparatus for field dressing small game animals such as squirrels and rabbits. The apparatus includes a base which can be immobilized by attachment to a supporting structure such as a tree. In the preferred embodiment, numerous apertures are provided on the laterally extending base structure so that it can be firmly attached to the side of a barn, a tree, or the like. An elongated rod member is attached at its end portions rigidly to the base at spaced apart, lateral positions. The points of attachment define substantially perpendicular angles with respect to the base, the rod having a central portion which is spaced away from the base, the central portion including a generally U-shaped section defined by a one hundred and eighty degree (180°) bend of the rod. A pair of spikes are spaced on opposite sides of the loop and extend generally forward of the base for supporting the hind legs of a small game animal carcass. In the preferred embodiment, the base is a rectangular, laterally extending plate. In the preferred embodiment, the rod member includes a central portion which is positioned away from the plate on the order of two inches so that when an animal is supported upon the rod member, it does not come in contact with the supporting base structure such as a tree, the side of barn, a building or the like.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 1:
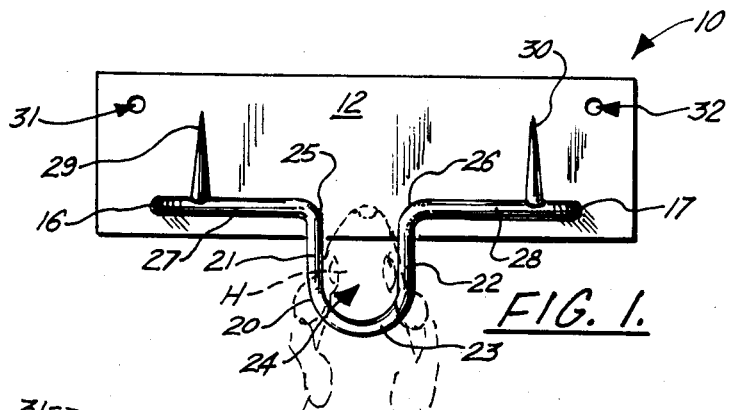
FIG. 1 is a front, elevational view of the preferred embodiment of the apparatus of the present invention.
Figure 2:
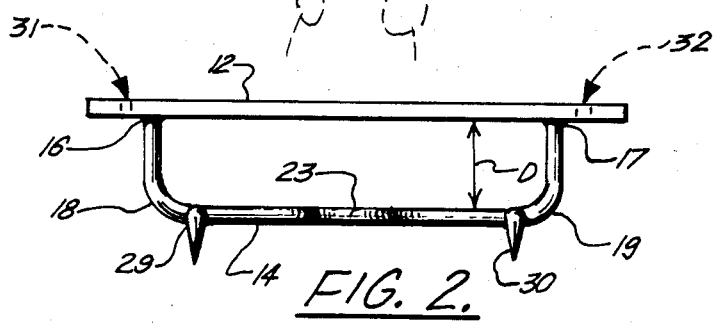
FIG. 2 is a top, plan view of the preferred embodiment of the apparatus of the present invention.
Figure 3:
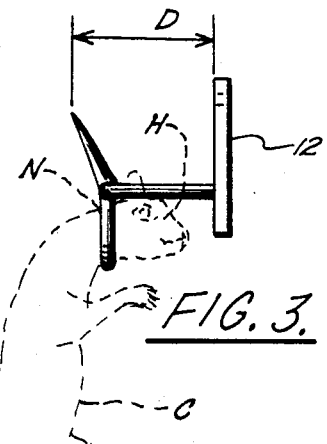
FIG. 3 is a side view of the preferred embodiment of the apparatus of the present invention.

FIGS. 1-4 best illustrate the preferred embodiment of the apparatus of the present invention designated generally by the numeral 10. Game skinner 10 includes a base plate 12 with a forwardly extending bar 14 having multiple bends as will be described more fully hereinafter. Bar 14 is attached at its end portions 16, 17 to base 12 by welding, for example. Both base plate 12 and bar 14 can be manufactured of any suitable, structural material which is also easily cleaned and not likely to corrode or rust (such as, for example, stainless steel). Bar 14 is bent at right angle bends 18, 19 so that its central portion between bends 18, 19 is spaced a distance L from base 12 (see FIGS. 2-3). The distance L is provided so that the carcass C of a game animal being skinned or field dressed can be supported in a position spaced away from base 12. This is important because base 12 would normally be connected rigidly to a supporting structure such as the side of a house or building, a large tree, a timber post, or the like. The distance L is provided to space the loop 20 and spikes 29, 30 away from the base 12 so that the carcass C can be field dressed or skinned without interference from the supporting structure. The apparatus 10 allows the carcass C to be field dressed or skinned without being spoiled by the bark of a supporting tree, the dirt or debris that might be on the side of such tree, or on the side of a building, barn, post or like supporting structure.

Bar 14 includes a centrally located U-shaped loop 20 that includes a pair of spaced apart, generally parallel vertical sections 21, 22, each of which is attached at its lower end portions integrally with curved section 23 to define a recess 24. The loop 20 is joined to a pair of horizontal sections 27, 28 of bar 14 by ninety degree (90°) angle bends 25, 26. The entire apparatus can be, for example, manufactured of a single bar of stainless steel by bending at ninety degree (90°) bends 18, 19 and ninety degree (90°) bends 25, 26 as well as one hundred and eighty degree (180°) curved section 23 as shown in the drawings. Spikes 29, 30 are spaced apart laterally (FIG. 1) and on each side of loop 20. Also, spikes 29, 30 are positioned generally between the ninety degree (90°) bends 18, 19. This assures that the spikes are positioned a distance L away from base 12.

The apparatus 10 as aforedescribed allows either the legs or head of the carcass C to be supported as desired during the field dressing or skinning operations. Notice, for example, in FIG. 3 where the head H of the carcass C occupies the recess 24 of the loop section 20. Normally, the distance between parallel vertical sections 21, 22 would be spaced apart a distance substantially smaller than the width of the head H of a particular carcass being field dressed. Further, the lateral distance between vertical sections 21, 22 would be large enough to allow placement of the neck N of such a carcass. In this manner any pressure applied downwardly would not remove the carcass from the position shown in FIG. 3.

Figure 4:
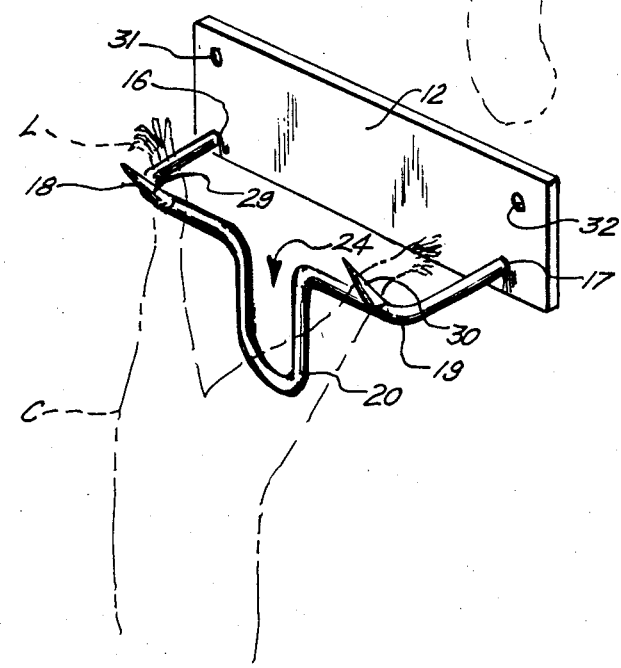
FIG. 4 is a perspective view of the preferred embodiment of the apparatus of the present invention.

If desired, the carcass can be hung from spikes 29, 30 as shown in FIG. 4 wherein the legs L of the carcass C are supported by spikes 29, 30.

Dimensional changes in the apparatus as described could be provided so that a number of different sizes would be used, for example, when field dressing different game animals such as squirrels, rabbits, and the like. The apparatus could also be used for field dressing feathered game animals with the teaching as described wherein the animal could be supported during the removal of feathers.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for field dressing small game animals comprising:
   a. a base;
   b. means for immobilizing the base by attachment to a supporting structure such as a tree;
   c. an elongated rod member having two end portions affixed rigidly to the base at spaced apart positions, said points of attachment defining substantially a perpendicular angle with said base plate, said rod having a central portion which is spaced from said base plate, said central portion including a generally U-shaped section defined by a 180° bend of said rod;
   d. a pair of spikes spaced on opposite sides of said loop and extending generally forwardly of said base for supporting the hind legs of a small game animal carcass.

2. The apparatus of claim 1 wherein the base is a generally rectangular plate having a lateral dimension which is greater than the vertical dimension thereof.

3. The apparatus of claim 1 wherein the base is a rectangular plate extending laterally, and the points of attachment of the rod to the plate define a line which is generally parallel to the horizontal edges of the plate.

4. The apparatus of claim 1 wherein the plate includes multiple perforations therethrough for allowing the insertion of fasteners through the openings so that the base plate can be secured firmly to an underlying structure such as a tree, or the side of a building using nails or screws.

5. The apparatus of claim 1 wherein the spikes are generally vertically positioned extending upwardly from the top surface of the elongated member.

6. The apparatus of claim 1 wherein the central portion of the rod defines an axis which is generally horizontal.

* * * * *